Patented Jan. 26, 1954

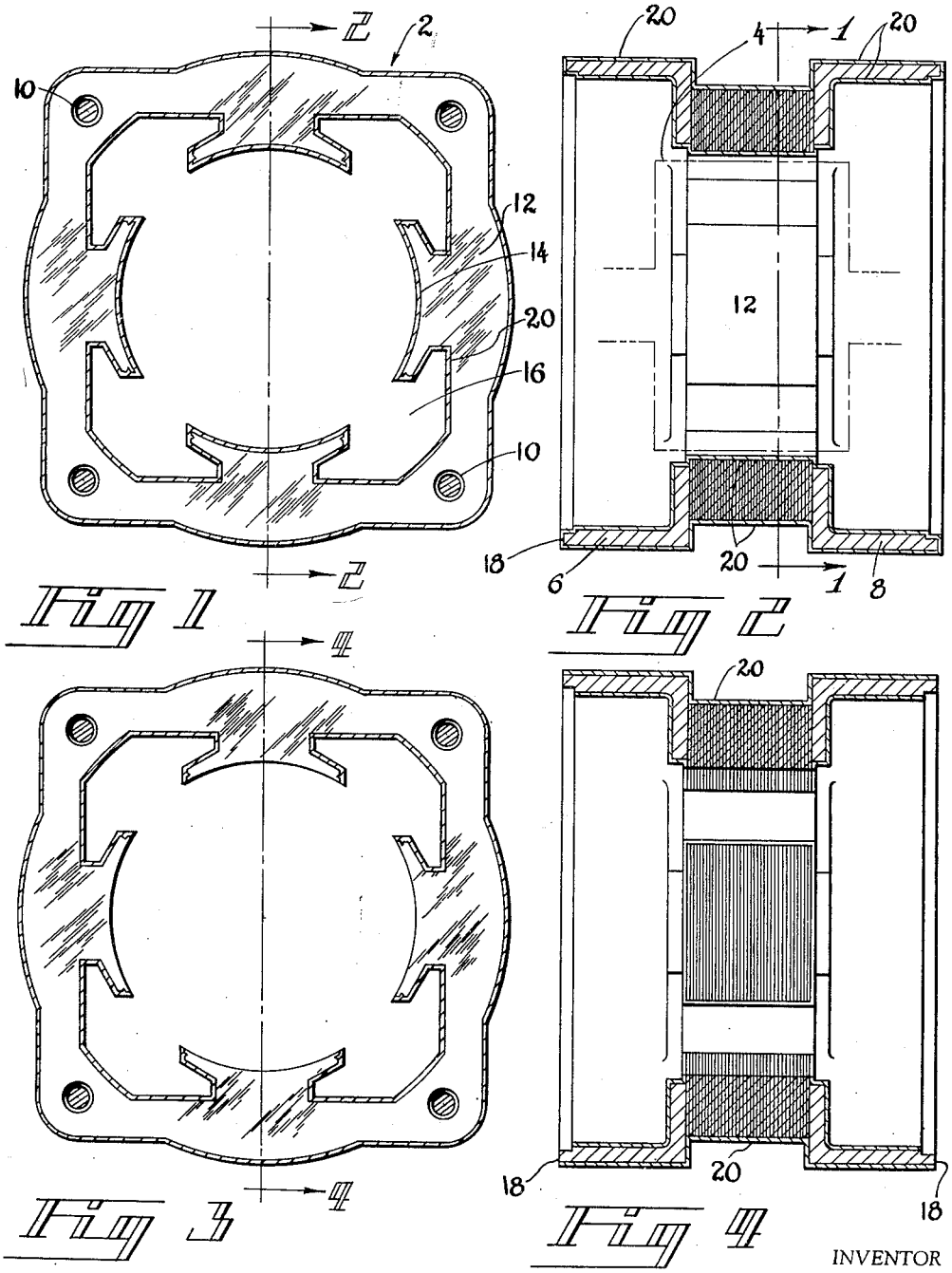

2,667,591

UNITED STATES PATENT OFFICE 2,667,591

STATOR FOR ELECTRICAL MACHINES

Frank H. Gindroz, Lawndale, Calif., assignor to Electrical Engineering and Manufacturing Corporation, Los Angeles, Calif., a corporation of California Application February 18, 1953, Serial No. 337,601

3 Claims. (Cl. 310—254)

This invention relates broadly to electrical machines such as motors and generators and, more particularly, to the suppression of the radiated electromagnetic field which is generated externally to such machines during their operation and which, as is very well known, interferes with radio transmission and reception. In this application the invention will be described as applied to an electric motor but it will be understood that it is useful in the entire field of electric machines which develop an external electromagnetic field.

My invention is described in the following specification and illustrated in the accompanying drawing, in which:

Fig. 1 is a cross-sectional view of the stator of an electric machine such as a motor, taken at right angles to its axis on line 1—1 of Fig. 2, showing a preliminary stage in the application of my invention thereto;

Fig. 2 is a cross-sectional view taken on line 2—2 of Fig. 1, and also showing a conventional rotor in broken lines, and Fig. 3 and 4 are views which are similar to Figs. 1 and 2, respectively, but which show my invention in its final form.

In the drawings, there is shown an electric motor having a stator 2 and armature 4. The armature, being entirely conventional and not forming a part of the invention, is shown in broken lines in Fig. 2 only. The stator may be of any known or desired structure and, in the form disclosed, comprises a central part formed of a plurality of metal laminations 4 forming a stack held together by end rings 6, 8 and bolts 10. The stator laminations have pole pieces 12 having arcuate surfaces 14 which lie closely adjacent the exterior surface of the armature when the stator and rotor parts of the machine are assembled. The stator may also be shaped to provide recesses 16 for the reception of stator windings and in the stator structure shown in the drawings these recesses are behind and between the adjacent ends of adjacent pole pieces. The described stator and rotor structure are conventional and, in themselves, form no part of the invention.

In the operation of such machines as that described, an electromagnetic field is radiated externally of the machine, by electric energy supplied to the windings of the stator and rotor, which field interferes with the operation of radio transmitting and receiving equipment located in proximity to the machine. This effect is well known and many devices and systems for reducing or eliminating it have been proposed. My invention is intended to, and does, substantially reduce or eliminate this externally radiated field and, in accordance with the invention, the entire interior and exterior surfaces of the stator, including the laminations 4, end rings 6, 8 and the ends of the bolts 10 are covered with a thin, impervious coating 20 of aluminum, excepting only the arcuate surfaces 14 of the pole pieces and, if desired, excepting also the outer end surfaces 18 of the end rings 6, 8. In practice, the coating is formed by spraying the entire interior and exterior surfaces of the stator with liquid aluminum, which is then allowed to harden. The coating may then be removed from the arcuate surfaces of the pole pieces and, if desired, from the end surfaces of the end rings by any known method, such as machinery. In an alternative method, the arcuate surfaces of the pole pieces and the end surfaces of the end rings may be covered, for example, by masking tape, the entire interior and exterior surfaces of the stator are then sprayed with liquid aluminum which is allowed to harden, and the masking tape is then removed.

The parts may be sprayed with liquid aluminum in a molten state by a well-known process which is known as "metallizing," in which halfhard, pure aluminum wire is fed through a flame gun and changed to a mist of molten metal which is directed onto the parts to be coated.

I have found that by treating a stator in the described manner the externally radiated electromagnetic field is eliminated or substantially reduced. The coating may be easily and cheaply applied and removed from the specified surfaces and is very effective for the intended purpose.

While I have described my invention as applied to the stator of an electric motor, it will be understood that it is generally applicable to any electrical machine which, during its operation, develops an external electromagnetic field. It will therefore be apparent to those skilled in the arts to which the invention relates that other embodiments than that disclosed, as well as modifications thereof, may be made and practised without departing in any way from the spirit or scope of the invention, for the limits of which reference must be had to the appended claims.

What is claimed is:

1. A stator for an electric machine of the type having a stator and a rotor, comprising a metallic structure having interior and exterior surfaces and having pole pieces having facing arcuate surfaces which are adjacent the external surface of the rotor in the assembled condition of the machine, and a thin, impervious coating of aluminum covering all of the interior and exterior surfaces of the stator except said arcuate surfaces of the pole pieces.

2. A stator for an electric machine of the type having a stator and a rotor, comprising a metallic structure having interior and exterior surfaces and having pole pieces having facing arcuate surfaces which are adjacent the external surface of the rotor in the assembled condition of the machine, and a thin, impervious coating of aluminum covering all of the interior and exterior surfaces of the stator except said arcuate surfaces of the pole pieces and the outer end surfaces of the stator.

3. A stator for an electric machine of the type having a stator and a rotor, comprising stacked metal laminations having inwardly-facing pole pieces having arcuate surfaces which are adjacent the external surface of the rotor in the assembled condition of the machine and being shaped to provide recesses for the reception of windings, an end ring at each end of the stack of laminations, bolts passing through the end rings and laminations to hold them in assembled condition, and a thin impervious coating of aluminum covering all of the interior and exterior surfaces of the stator except the said arcuate surfaces of the pole pieces and the outer end surfaces of the end rings.

FRANK H. GINDROZ.

No references cited.